US012664648B2

(12) United States Patent
Xu et al.

(10) Patent No.: US 12,664,648 B2
(45) Date of Patent: Jun. 23, 2026

(54) METHODS AND SYSTEMS FOR PROCESSING AN IMAGE

(71) Applicant: SHANGHAI UNITED IMAGING HEALTHCARE CO., LTD., Shanghai (CN)

(72) Inventors: Manjiao Xu, Shanghai (CN); Jun Yang, Shanghai (CN); Kairui Hu, Shanghai (CN); Tao Sun, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 322 days.

(21) Appl. No.: 18/366,650

(22) Filed: Aug. 7, 2023

(65) Prior Publication Data

US 2024/0046470 A1 Feb. 8, 2024

(30) Foreign Application Priority Data

Aug. 5, 2022 (CN) .......................... 202210937537.5

(51) Int. Cl.
*G06T 7/00* (2017.01)
*G06V 10/80* (2022.01)
(52) U.S. Cl.
CPC ............ *G06T 7/0012* (2013.01); *G06V 10/80* (2022.01); *G06T 2207/10088* (2013.01); *G06T 2207/20081* (2013.01)
(58) Field of Classification Search
CPC ......... G06T 7/0012; G06T 2207/10088; G06T 2207/20081; G06T 11/008; G06T 2207/20084; G06T 2207/20221; G06T 5/70; G06V 10/80; G06V 2201/03; G06V 10/776; G06V 10/82

See application file for complete search history.

(56) References Cited

U.S. PATENT DOCUMENTS

| | | | |
|---|---|---|---|
| 10,878,311 B2 | 12/2020 | Vellagoundar et al. | |
| 2012/0237100 A1* | 9/2012 | Grimm .............. | G01R 33/5608 |
| | | | 382/131 |
| 2020/0341100 A1 | 10/2020 | Heukensfeldt Jansen et al. | |
| 2020/0405175 A1 | 12/2020 | Laub et al. | |

(Continued)

FOREIGN PATENT DOCUMENTS

| | | | | |
|---|---|---|---|---|
| CN | 110717958 A | * | 1/2020 | ............... G06N 3/08 |
| CN | 111784792 A | | 10/2020 | |
| CN | 113870144 A | | 12/2021 | |

(Continued)

OTHER PUBLICATIONS

First Office Action in Chinese Application No. 202210937537.5 mailed on Dec. 25, 2025, 12 pages.

*Primary Examiner* — Oneal R Mistry
*Assistant Examiner* — Justin Philip Cascais
(74) *Attorney, Agent, or Firm* — METIS IP LLC

(57) ABSTRACT

Embodiments of the present disclosure provide methods and systems for processing a medical image. The method may include obtaining a first image; determining a second image by optimizing the first image; and obtaining a third image by inputting the second image and K-space dataset determined based on the second image into a fidelity model, wherein the fidelity model includes a trained machine learning model.

14 Claims, 5 Drawing Sheets

100

(56)     References Cited

U.S. PATENT DOCUMENTS

2021/0156940  A1      5/2021   Sommer et al.
2024/0290011  A1 *    8/2024   Zhou ................... G06N 3/0895

FOREIGN PATENT DOCUMENTS

CN          114140404  A      3/2022
CN          114782576  A      7/2022
WO     WO-2020186013  A2 *    9/2020   ......... G01R 33/5611

* cited by examiner

100

<u>200</u>

Acquisition Module
<u>210</u>

Optimization Module
<u>220</u>

Fidelity Module
<u>230</u>

METHODS AND SYSTEMS FOR PROCESSING AN IMAGE

CROSS-REFERENCE TO RELATED APPLICATIONS

This application claims priority to Chinese Patent Application No. 202210937537.5, filed on Aug. 5, 2022, the entire contents of which are incorporated herein by reference.

TECHNICAL FIELD

The present disclosure relates to the field of medical technology, in particular, to methods and systems for processing an image.

BACKGROUND

The deep learning technique has been applied to denoising, artifact removal, super-resolution and other processing operations for an image. However, the deep learning technique utilizes a direct mapping from an input to an output, thus reliability is concerned, and a processed image may also be distorted.

Therefore, it is desirable to provide methods and systems for processing an image to improve the quality of the image and ensure the fidelity of the image.

SUMMARY

An aspect of the present disclosure provides a method. The method may include obtaining a first image and determining a second image by optimizing the first image. The method may also include obtaining a third image by inputting the second image and a K-space dataset determined based on the second image into a fidelity model, wherein the fidelity model includes a trained machine learning model.

In some embodiments, wherein a training process of the fidelity model includes: obtaining a plurality of training samples, each of the plurality of training samples including one or more sample images and one or more sample K-space datasets, the one or more sample images including a sample second image determined by optimizing a sample first image and a gold-standard sample image corresponding to the sample second image, the one or more sample K-space datasets including a sample second K-space dataset corresponding to the sample second image and a sample reference K-space dataset, the sample reference K-space dataset being determined based on the sample first image and the sample second image or determined based on the sample second K-space dataset and a sample first K-space dataset corresponding to the sample first image; training a preliminary fidelity model based on the plurality of training samples; and in response to that a preset condition is met, obtaining the fidelity model.

In some embodiments, wherein at least one loss function of the fidelity model includes a loss function in an image domain and a loss function in a K-space data domain; the training process includes training the preliminary fidelity model based on the plurality of training samples by collectively using the loss function in the image domain and the loss function in the K-space data domain.

In some embodiments, wherein the loss function in the image domain is obtained based on the sample second image and the gold-standard sample image.

In some embodiments, wherein the loss function in the K-space data domain is obtained based on the sample second K-space dataset and the sample reference K-space dataset.

In some embodiments, wherein the determining the sample reference K-space dataset based on a first K-space dataset corresponding to the sample first image and the second K-space dataset corresponding to the sample second image includes: designating K-space center dataset of the sample first K-space dataset as K-space center dataset of the sample reference K-space dataset.

In some embodiments, wherein the first image is optimized using an optimization model, wherein the optimization model includes a trained second machine learning model.

In some embodiments, wherein the sample reference K-space dataset is determined according to operations including: determining a fusion level, the fusion level representing a proportional relationship between the sample first image and the sample second image or the fusion level representing a proportional relationship between the sample first K-space dataset and the sample second K-space dataset; and determining, based on the fusion level, the sample reference K-space dataset.

Another aspect of the present disclosure provides a system. The system may include at least one storage device storing a set of instructions; and at least one processor in communication with the storage device. When executing the set of instructions, the at least one processor may be configured to cause the system to perform operations including: obtaining a first image; determining a second image by optimizing the first image; and obtaining a third image by inputting the second image and a K-space dataset determined based on the second image into a fidelity model, wherein the fidelity model include a trained machine learning model.

In some embodiments, wherein a training process of the fidelity model includes: obtaining a plurality of training samples, each of the plurality of training samples including one or more sample images and one or more sample K-space datasets, the one or more sample images including a sample second image determined by optimizing a sample first image and a gold-standard sample image corresponding to the sample second image, the one or more sample K-space datasets including a sample second K-space dataset corresponding to the sample second image and a sample reference K-space dataset, the sample reference K-space dataset being determined based on the sample first image and the sample second image or determined based on the sample second K-space dataset and a sample first K-space dataset corresponding to the sample first image; training a preliminary fidelity model based on the plurality of training samples; and in response to that a preset condition is met, obtaining the fidelity model.

In some embodiments, wherein at least one loss function of the fidelity model includes a loss function in an image domain and a loss function in a K-space data domain; the training process includes training the preliminary fidelity model based on the plurality of training samples by collectively using the loss function in the image domain and the loss function in the K-space data domain.

In some embodiments, wherein the loss function in the image domain is obtained based on the sample second image and the gold-standard sample image.

In some embodiments, wherein the loss function in the K-space data domain is obtained based on the sample second K-space dataset and the sample reference K-space dataset.

In some embodiments, wherein the determining the sample reference K-space dataset based on a first K-space dataset corresponding to the sample first image and the second K-space dataset corresponding to the sample second image includes: designating K-space center dataset of the sample first K-space dataset as K-space center dataset of the sample reference K-space dataset.

In some embodiments, wherein the first image is optimized using an optimization model, wherein the optimization model includes a trained second machine learning model.

In some embodiments, wherein the sample reference K-space dataset is determined according to operations including: determining a fusion level, the fusion level representing a proportional relationship between the sample first image and the sample second image or the fusion level representing a proportional relationship between the sample first K-space dataset and the sample second K-space dataset; and determining, based on the fusion level, the sample reference K-space dataset.

Another aspect of the present disclosure provides a non-transitory computer readable medium storing instructions. When the instructions are executed by at least one processor, the instructions may cause the at least one processor to implement a method comprising: obtaining a first image; determining a second image by optimizing the first image; and obtaining a third image by inputting the second image and a K-space dataset determined based on the second image into a fidelity model, wherein the fidelity model includes a trained machine learning model.

In some embodiments, wherein a training process of the fidelity model includes: obtaining a plurality of training samples, each of the plurality of training samples including one or more sample images and one or more sample K-space datasets, the one or more sample images including a sample second image determined by optimizing a sample first image and a gold-standard sample image corresponding to the sample second image, the one or more sample K-space datasets including a sample second K-space dataset corresponding to the sample second image and a sample reference K-space dataset, the sample reference K-space dataset being determined based on the sample first image and the sample second image or determined based on the sample second K-space dataset and a sample first K-space dataset corresponding to the sample first image; training a preliminary fidelity model based on the plurality of training samples; and in response to that a preset condition is met, obtaining the fidelity model.

In some embodiments, wherein at least one loss function of the fidelity model includes a loss function in an image domain and a loss function in a K-space data domain; the training process includes training the preliminary fidelity model based on the plurality of training samples by collectively using the loss function in the image domain and the loss function in the K-space data domain.

In some embodiments, wherein the loss function in the image domain is obtained based on the sample second image and the gold-standard sample image.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein:

4

Figure 1:
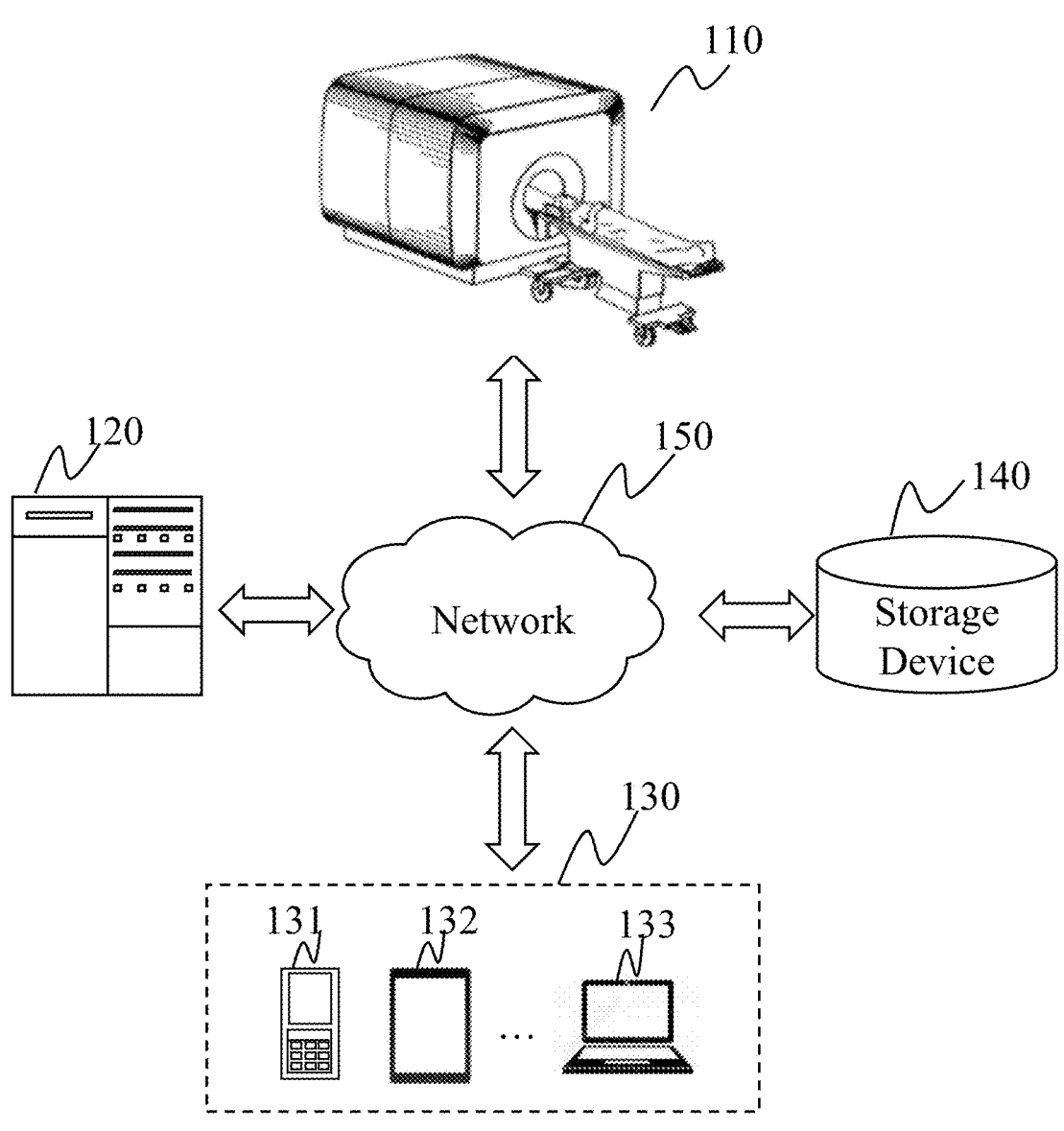
Figure 3:
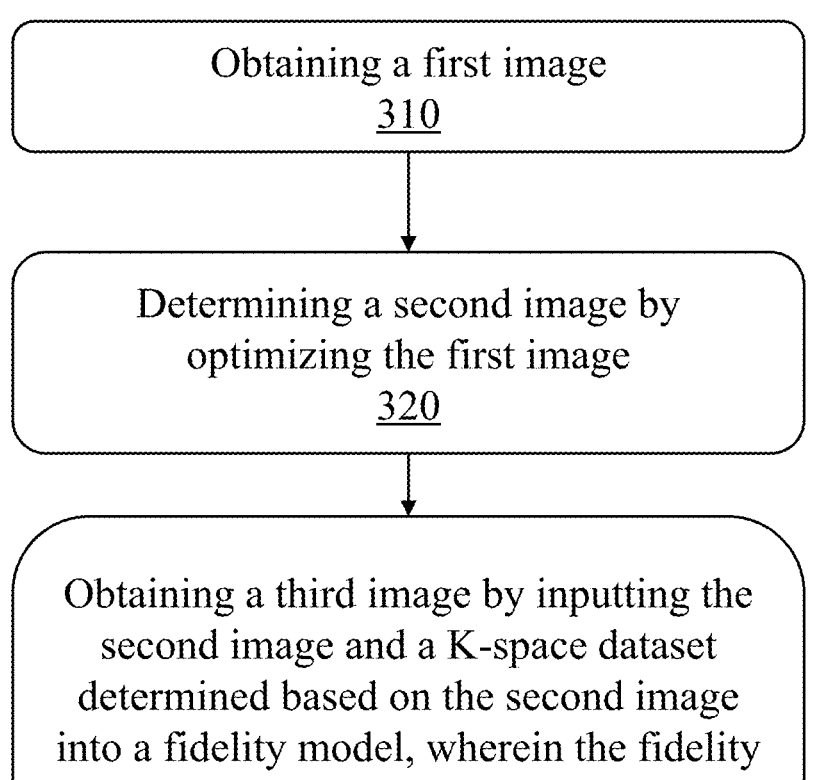
Figure 4:
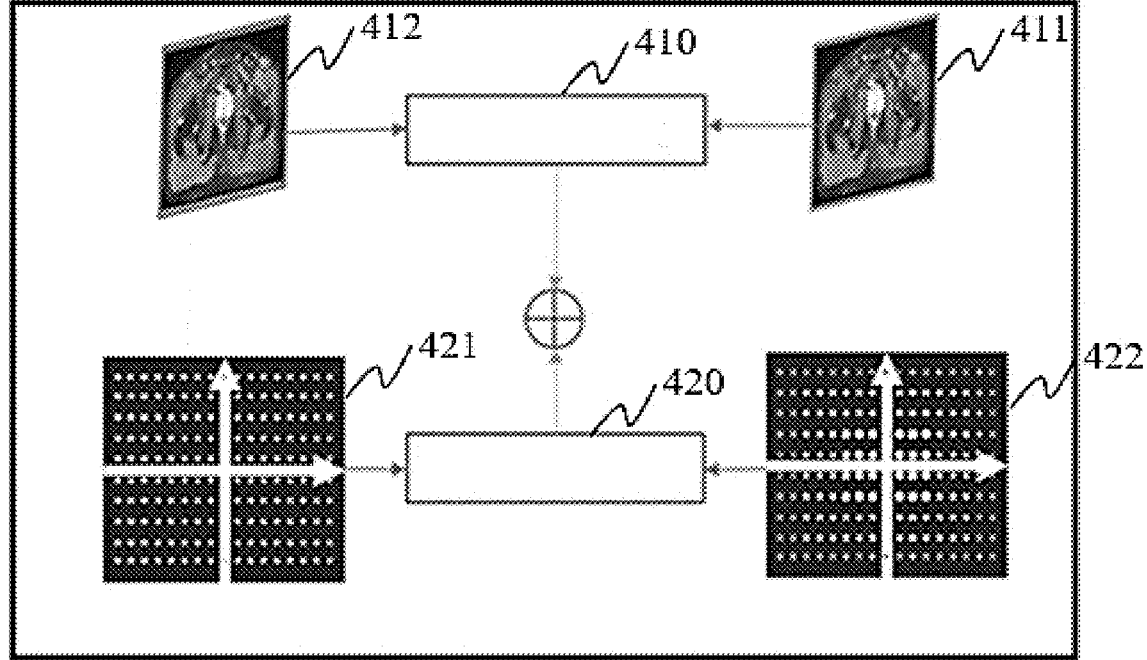
Figure 5:
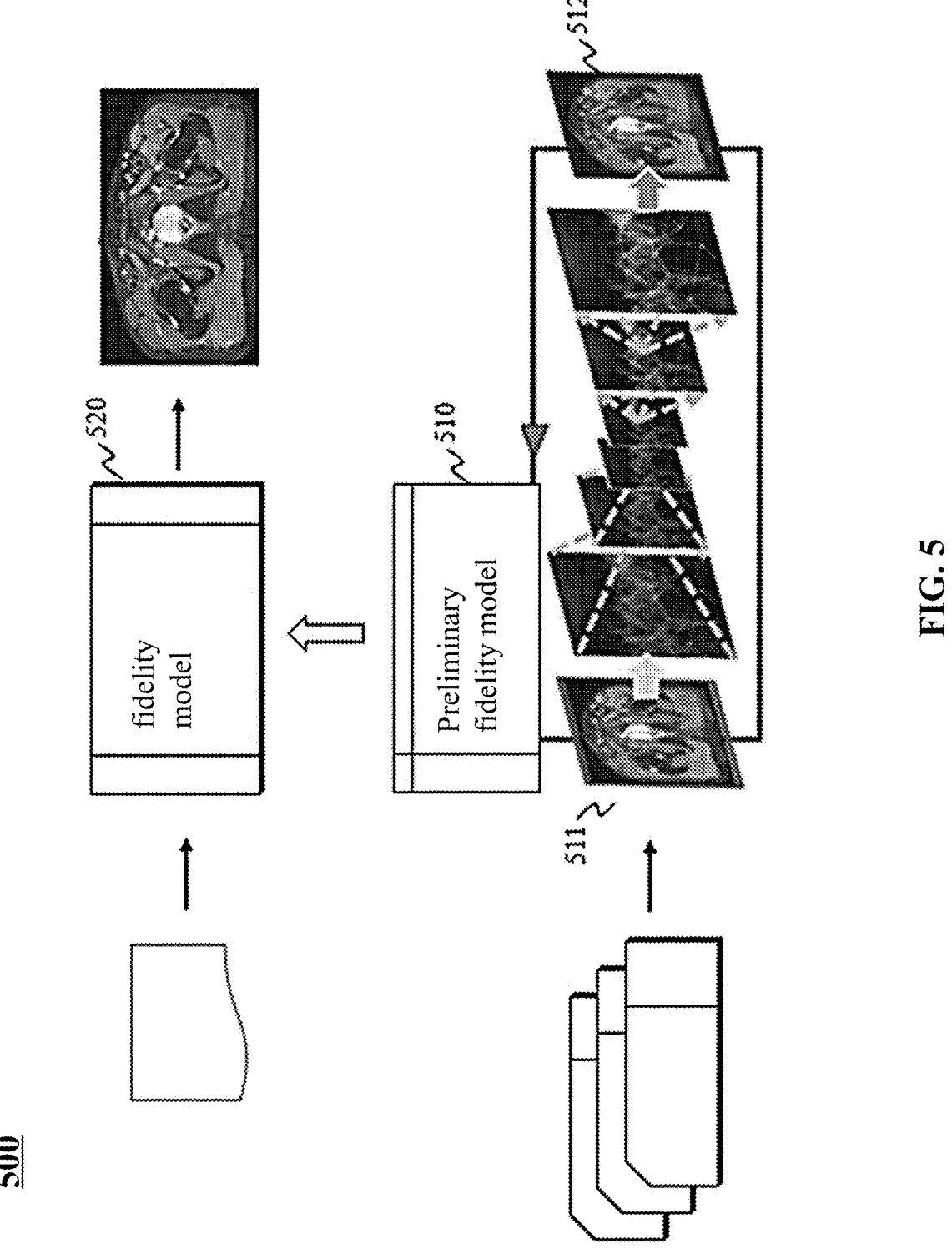

FIG. 1 is a schematic diagram illustrating an exemplary system for processing an image according to some embodiments of the present disclosure;

FIG. 2 is a block diagram illustrating an exemplary processing device for processing an image according to some embodiments of the present disclosure;

FIG. 3 is a flowchart illustrating an exemplary process for processing an image according to some embodiments of the present disclosure;

FIG. 4 is a schematic diagram illustrating an exemplary process for processing an image according to some embodiments of the present disclosure; and FIG. 5 is a schematic diagram illustrating an exemplary process for training a fidelity model according to some embodiments of the present disclosure.

DETAILED DESCRIPTION

In order to illustrate the technical solutions related to the embodiments of the present disclosure, a brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The flowcharts used in the present disclosure may illustrate operations executed by the system according to embodiments in the present disclosure. It should be understood that a previous operation or a subsequent operation of the flowcharts may not be accurately implemented in order. Conversely, various operations may be performed in inverted order, or simultaneously. Moreover, other operations may be added to the flowcharts, and one or more operations may be removed from the flowcharts.

In the existing technologies, image information is mainly constrained and backfilled to achieve fidelity.

In the embodiments of the present disclosure, a method and a system for processing an image is provided. A fidelity processing may be performed on the image after an optimization processing (e.g., a denoising, an artifact removal, a super-resolution, etc.) is performed on the image to achieve a fidelity effect of the image and improve the image processing efficiency.

FIG. 1 is a schematic diagram illustrating an exemplary system for processing an image according to some embodiments of the present disclosure. In some embodiments, as shown in FIG. 1, the system 100 for processing the image may include a scanning device 110, a processing device 120, a terminal 130, a storage device 140, and a network 150.

The scanning device 110 may scan an object within a detection region or a scanning region to obtain scanning data of the object. In some embodiments, the object may include a biological object and/or a non-biological object. For example, the object may be alive, inanimate organic and/or inorganic substances.

In some embodiments, the scanning device 110 may include a permanent-magnetic resonance imaging (MRI) device, a constant conduction MRI device, a superconducting MRI device, a nuclear MRI device, an electronic paramagnetic resonance imaging device, an electron paramagnetic resonance imaging device, etc., or any combination thereof. In some embodiments, the scanning device 110 may include a single-modality scanner and/or a multi-modality scanner. The single-mode scanner may include, for example, an MRI scanner. The multimodal scanner may include, for example, an X-ray-MRI scanner, a single photon emission computed tomography-MRI (SPECT-MRI) scanner, a digital subtraction angiography-MRI (DSA-MRI) scanner, or any combination thereof. The above description for the scanning device is merely for illustrative purposes and may not be intended to limit the scope of the present disclosure.

The processing device 120 may process data and/or information obtained from the scanning device 110, the terminal 130, the storage device 140, and/or other components of the system 100. For example, the processing device 120 may obtain an image (e.g., a first image, a second image, a fused image, a gold-standard image, etc.,) from the terminal 130 and the storage device 140, and analyze and process the image. As another example, the processing device 120 may obtain a first image, determine a second image by optimizing the first image, and obtain a third image by inputting the second image and a K-space dataset determined based on the second image into a trained first machine learning model.

In some embodiments, the processing device 120 may be a single sever or a server group. The sever groups may be centralized or distributed. In some embodiments, the processing device 140 may be local or remote. For example, the processing device 120 may access information and/or data from the scanning device 110, the terminal 130, and/or the storage device 140 via the network 130. As another example, the processing device 120 may be directly connected to the scanning device 110, the terminal 130, and/or the storage device 140 to access information and/or data. In some embodiments, the processing device 120 may be implemented on a cloud platform. Merely by way of example, the cloud platform may include a private cloud, a public cloud, a hybrid cloud, a community cloud, a distributed cloud, an internal cloud, a multi-layer cloud, or any combination thereof.

In some embodiments, the processing device 120 and the scanning device 110 may be integrated. In some embodiments, the processing device 120 and the scanning device 110 may be directly or indirectly connected to jointly implement the methods and/or functions described in the present disclosure.

In some embodiments, the processing device 120 may include an input device and/or an output device. Through the input and/or the output device, an interaction (e.g., setting a level of image fusion, labeling a gold-standard image, etc.) with a user may be achieved. In some embodiments, the input device and/or the output device may include a display screen, a keyboard, a mouse, a microphone, or any combination thereof.

The terminal 130 may communicate and/or connect with the scanning device 110, the processing device 120, and/or the storage device 140. In some embodiments, interaction with the user may be achieved through the terminal 130. In some embodiments, the terminal 130 may include a mobile device 131, a tablet computer 132, a laptop computer 133, or any combination thereof. In some embodiments, the terminal 130 (or all or a portion of functions) may be integrated into the processing device 120. The storage device 140 may store data, instructions, and/or any other information. In some embodiments, the storage device 140 may store data (e.g., the first image, the second image, the fused image, the gold-standard image, K-space dataset, etc.) obtained from the scanning device 110, the processing device 120, and/or the terminal 130. In some embodiments, the storage device 140 may store data and/or instructions used by processing device 120 to execute or use to complete the methods described in the present disclosure.

In some embodiments, storage device 140 may include one or more storage components, each of which may be an independent device or a part of other devices. In some embodiments, the storage device 140 may include a random-access memory (RAM), a read-only memory (ROM), a mass memory, a removable memory, a volatile read-write memory, or any combination thereof. In some embodiments, the storage device 140 may be implemented on a cloud platform. In some embodiments, the storage device 140 may be a part of the scanning device 110, the processing device 120, and/or the terminal 130.

The network 150 may include any suitable network that can facilitate information and/or data exchange. In some embodiments, at least one component (e.g., the scanning device 110, the processing device 120, the terminal 130, and the storage device 140) of the system 100 of the system may exchange information and/or data with at least one other component of the system 100 of the system via the network 150. For example, the processing device 120 may obtain the first image from the scanning device 110 via the network 150.

It should be noted that the above descriptions for the system 100 are merely provided for illustrative purposes and may not be intended to limit the scope of the present disclosure. For those of ordinary skill in the art, various changes and modifications may be made under the guidance of the present disclosure. For example, the system 100 for processing the image may be implemented on other device to achieve similar or different functions. However, these changes and modifications may not deviate from the scope of the present disclosure.

FIG. 2 is a block diagram illustrating an exemplary processing device for processing an image according to some embodiments of the present disclosure. In some embodiments, as shown in FIG. 2, the processing device 200 for processing the image may include an acquisition module 210, an optimization module 220, and a fidelity module 230. In some embodiments, operations of the processing device 200 may be performed by the processing device 120.

The acquisition module 210 may be used to obtain an original image (also referred to as a first image). More description for obtaining the first image may be found elsewhere in the present disclosure, for example, operation 310 and the relevant description in FIG. 3.

The optimization module 220 may be used to determine an output image (also referred to as a second image) by optimizing the first image. More description for optimizing the first image may be found elsewhere in the present disclosure, for example, operation 320 and the relevant description in FIG. 3.

The fidelity module 230 may be used to obtain a fidelity image (also referred to as a third image) by inputting the second image and a K-space dataset determined based on the second image into a fidelity model. The fidelity model may include a trained machine learning model (also referred to as a trained first machine learning model). More description for obtaining the third image may be found elsewhere in the present disclosure, for example, operation 330 and the relevant description in FIG. 3.

It should be understood that the processing device 200 and the modules shown in FIG. 2 may be implemented in various ways. For example, the processing device 200 and the modules shown in FIG. 2 may be implemented based on a combination of hardware, software, or a combination of software and hardware. The system and the modules in the present disclosure may not merely be realized by hardware circuits of a programmable hardware device such as a very-large scale Integration or gate array, a semiconductor such as a logic chip and a transistor, or a programmable hardware device such as field programmable gate array (FPGA) and a programmable logic device (PLD), but also by software executed by various types of processors, or a combination (e.g., a firmware) of hardware circuit and software mentioned above.

It should be noted that the above description for the system and the modules is merely for convenience, and may not limit the scope of the present disclosure. It can be understood that for those of ordinary skill in the art, after understanding the principle of the system, it is possible to arbitrarily combine various modules or connect sub-systems with other modules without deviating from this principle.

FIG. 3 is a flowchart illustrating an exemplary process for processing an image according to some embodiments of the present disclosure. In some embodiments, process 300 may be performed by the processing device 120 or the processing device 200 for processing a medical image. For example, process 300 may be stored in a form of a program or instruction in a storage device (e.g., a storage unit of the storage device 140, or the processing device 120), and may be performed when a processor or a module shown in FIG. 2 executes the program or instruction. In some embodiments, process 300 may utilize one or more additional operations not described below, and/or may not be completed based on one or more of the operations discussed below. Additionally, a sequence of operations shown in FIG. 3 is not restrictive.

In 310, a first image may be obtained. In some embodiments, operation 310 may be performed by the processing device 120 or the acquisition module 210.

In some embodiments, the first image may include an image to be processed (e.g., an image to be denoised, an image to be artifact removed, an image to be super-resolution processed). For example, the first image may be a reconstructed image obtained from image data acquired by the scanning device 110, or an image to be optimized sent by a lower-level medical institution to a higher-level medical institution. As a further example, the first image may be an MRI image, an X-ray MRI image, a SPECT-MRI image, a DSA-MRI image, etc. Due to reasons such as a motion of a patient, a foreign matter inside or outside the body, and/or a device limitation, the first image may contain artifacts and/or noises, and a signal-to-noise ratio and/or a resolution of the first image may not meet a standard. In some embodiments, the first image may include a medical image.

In some embodiments, the first image may be obtained from a storage unit of the scanning device 110, the storage device 140, the processing device 120, etc. In some embodiments, the acquisition module 210 may obtain the first image by reading from a storage device, a database, by invoking a data interface, or other means.

In 320, a second image may be determined by optimizing the first image. In some embodiments, operation 320 may be performed by the processing device 120 or the optimization module 220.

Optimizing the first image may include performing an optimization operation on the first image. An exemplary optimization operation may include a denoising operation, a super-resolution operation, or the like. The quality (i.e., image quality) of the second image obtained after optimization may be better than the quality of the first image. The image quality may be defined by noises, signal-to-noise ratio, artifacts, resolution, etc. For example, the second image may have a higher signal-to-noise ratio, a higher resolution, less artifacts, and less noises than the first image.

In some embodiments, optimizing the first image may be performed using an optimization model. The optimization model may include a trained machine learning model (also referred to as a trained second machine learning model). In other words, the optimization processing may be achieved based on the trained second machine learning model. In some embodiments, the trained second machine learning model may be constructed based on a deep neural network (DNN) model, a support vector machine model, a k-nearest neighbor model, a decision tree model, or the like, or any combination thereof. The DNN model may include a convolutional neural network (CNN), a LeCun Net (LeNet), a GoogLeNeT, an ImageNet, an AlexNet, a visual geometry group (VGG), a ResNet, a recursive neural network (RNN), a generative adversarial networks (GAN), or the like, or any combination thereof.

In some embodiments, the second image may be obtained by optimizing the resolution of the first image. In some embodiments, the trained second machine learning model may be used to optimize the resolution of the first image to obtain the second image. In some embodiments, multiple trained second machine learning models may be obtained. Each of the trained second machine learning models may correspond to one of different resolutions or different resolution ranges. Each of the trained second machine learning models may be used to generate an optimized image (e.g., the second image) having a specific resolution greater than or equal to the resolution of the first image by optimizing the first image.

In some embodiments, one of the multiple trained second machine learning models may be determined for optimizing the first image. In some embodiments, the resolution of the first image may be the same as or similar to the resolution the determined trained second machine learning model corresponds to. In some embodiments, the resolution of the first image may be in the resolution range the trained second machine learning model corresponds to. The trained second machine learning model for resolution optimization may also be referred to as a super-resolution model corresponding to a resolution (sizes of pixels in an image). For example, the trained second machine learning model may include a super-resolution model 1, suitable for a resolution in a range of [0-0.5 mm), or a super-resolution model 2 suitable for a resolution in a range of [0.5 mm-1 mm), or a super-resolution model 3 suitable for a resolution in a ranges of [1 mm-1.5 mm), etc. A resolution of an output super-resolution image of each super-resolution model may be greater than or equal to a resolution of an input image. Each of the multiple super-resolution models may be trained based on sample data with resolutions within a corresponding range.

In some embodiments, the processing device 120 may determine a current resolution of the first image. and based on the current resolution of the first image, the processing device 120 may select a suitable super-resolution model from the multiple trained second machine learning models (i.e., super-resolution models) to optimize the first image. For example, if the current resolution of the first image is 0.4 mm, the super-resolution model 1 may be determined to optimize the first image.

In some embodiments, the second image may be obtained by denoising the first image. In some embodiments, the trained second machine learning model may be used to denoise the first image. In some embodiments, the second machine learning model may be trained based on sample noise images with noises and denoised images (also referred to as denoised gold-standard images). The sample noise images with noises may be obtained by a manner of ray tracing. In some embodiments, during training the second machine learning model, the sample noise images and an auxiliary parameter may be used as inputs. The auxiliary parameter may include a generating color, a depth, and a normal vector of each pixel in one of the sample noise images. In some embodiments, the auxiliary parameter of a sample noise image may be obtained by performing a light casting on pixels and/or voxels in the sample noise image. For example, a casting light may be emitted from each pixel in a sample noise image, and a direction of the casting light may be along a projection direction of a corresponding position on a projection plane of a camera used in the manner of ray tracing. A mapping relationship (i.e., a color table) among a gray value, a color, and an opacity is used to overlay a color and an opacity of each position where the casting light passes through. The mapping relationship (i.e., a color table) among a gray value, a color, and an opacity may be the same as a mapping relationship used in the manner of ray tracing. Then, a generating color corresponding to each pixel may be determined. When the opacity overlapped by the casting light exceeds a certain threshold, a depth and a normal direction corresponding to a position of the each pixel may be recorded as the auxiliary parameters.

In some embodiments, the denoised gold-standard image may be obtained by manners such as manual denoising, stacking average ray casting results, etc.

In some embodiments, during training the second machine learning model, the second machine learning model may process the sample noise images and the auxiliary parameters to obtain a predicted denoising result. The predicted denoising result may include at least one of an image without noise or an image with less noise compared with the sample noise images. Based on a process of training, the second machine learning model may learn a correlation between features of the denoised gold-standard image, features of the sample noise images with noises, and features of the auxiliary parameter, thus obtaining the predicted denoising result based on the correlation.

In some embodiments, a loss function used for training the second machine learning model may be obtained based on the predicted denoising result and the denoised gold-standard image. For example, a feature parameter difference (e.g., a difference between RGB values, a difference on gray values, or a difference on opacities) between each pixel in the predicted denoising result and each pixel in the denoised gold standard image, and a difference of feature parameter gradients (e.g., a difference between RGB gradients, a difference on gray gradients, or a difference on opacity gradients) between each pixel in the predicted denoising result and each pixel in the denoised gold standard image may be designated as a portion of the loss function.

In some embodiments, the trained second machine learning model may be used for performing a first optimization and a second optimization on the first image. For example, the trained second machine learning model may include a first sub-model for performing the first optimization and the second sub-model for performing a second optimization. In some embodiments, the first optimization may be different from the second optimization. For example, the trained second machine learning model may include a denoising sub-model for denoising optimization and a super-resolution sub-model for resolution optimization. In some embodiments, the first optimization may be the same as the second optimization. For example, the trained second machine learning model may include a first super-resolution sub-model corresponding to a first resolution or resolution range and a super-resolution sub-model corresponding to a second resolution or resolution range that is different from the first resolution or resolution range.

The trained second machine learning model may be obtained based on multiple training samples according to a training algorithm. Exemplary training algorithms may include a Gradient Descent algorithm, a Stochastic Gradient Descent algorithm, an Adaptive Moment Estimation algorithm, a Backpropagation algorithm, etc. Each of the multiple training samples may include a sample image deserved as an input of the training of the trained second machine learning model and a reference image corresponding to the sample image deserved as a desired output of the training of the trained second machine learning model. The reference image may be obtained by optimizing the sample image. Exemplary optimization operations may include a denoising operation, a super-resolution operation, or the like.

For example, the trained second machine learning model may be used for resolution optimization and denoising. As a further example, the trained second machine learning model may include a denoising sub-model and a super-resolution sub-model.

The second machine learning model may be trained based on sample images with low resolutions and noises. For example, the second machine learning model may include a super-resolution sub-model and a denoising sub-model. Based on the sample images, the super-resolution sub-model and the denoising sub-model may trained respectively. The first image may be input into the super-resolution sub-model to obtain a super-resolution result. The super-resolution result may include an image with a high resolution (i.e., a high definition). For example, an image with 1024*1024 pixels may be obtained by inputting the first image with 512*512 pixels into the super-resolution sub-model. The first image may also be input into the denoising sub-model to obtain a denoising result. Based on weight values of a resolution and the noise, pixels in the super-resolution result and pixels in the denoising result may be weighted to obtain an output image of the second machine learning model. The weight values of the resolution and the noise may be obtained based on experience and/or requirements. For example, the weight values of resolution and noise may be provided as 0.55 and 0.45, respectively.

In 330, a third image may be obtained by inputting the second image and a K-space dataset determined based on the second image into a fidelity model. The fidelity model may include a trained machine learning model (also referred to as a trained first machine learning model). The fidelity model may be trained based on a plurality of training samples, each training sample may include one or more sample images and one or more sample K-space datasets corresponding to the one or more sample images. In some embodiments, operation 330 may be performed by the processing device 120 or the fidelity module 230.

In some embodiments, the K-space dataset determined based on the second image may be obtained by performing a Fourier transform on the second image.

The fidelity model refers to a trained machine learning model used for image fidelity. The fidelity model may include a DNN model, such as a CNN, a LeNet, a GoogLe-NeT, an ImageNet, an AlexNet, a VGG, a ResNet, a RNN, a GAN, or the like, or any combination thereof. In some embodiments, the structure of the fidelity model and the optimization model may be the same or different.

In some embodiments, the fidelity model may have same structures as the DNN model used for optimizing the first image, and the optimization processing may include denoising, artifact removal, super-resolution, or other processes. In some embodiments, the fidelity processing may be a post-processing after the optimization processing, for example, the first image may be optimized, and then be processed by the fidelity model.

In some embodiments, training of the fidelity model involves using of at least one loss function.

In some embodiments, the at least one loss function of the fidelity model may include at least one of a loss function in an image domain or a loss function in a K-space data domain.

In some embodiments, the at least one loss function may be determined based on the loss function in the image domain and the loss function in the K-space data domain. In some embodiments, the at least one loss function may be obtained by adding the loss function in the image domain with the loss function in the K-space data domain. In some embodiments, the at least one loss function may be obtained by weighting and adding the loss function in the image domain with the loss function in the K-space data domain. For example, as shown in FIG. 4, a loss function 410 in the image domain and a loss function 420 in the data domain may be added or weighted and added to obtain the loss function of the fidelity model. In some embodiments, the weight values in the weight and add operation on the loss function in the image domain with the loss function in the K-space data domain may be adjusted based on experimental results. For example, during the training process of the fidelity model, different weight values may be set, and optimal weight values may be selected based on the fidelity model's performance on a validation set.

In some embodiments, the loss function in the image domain may be obtained based on the sample second image and the gold-standard sample image. The loss function in the image domain may be configured to reflect a difference between an image feature (e.g., a pixel value, a contrast) of the sample second image and an image feature of the gold-standard sample image. For example, as shown in FIG. 4, the loss function 410 in the image domain may be obtained based on a gold-standard sample image 411 and a sample second image 412. For example, the fidelity module may perform a standard deviation processing, or a cross entropy processing on the gold-standard sample image 411 and the sample second image 412 to obtain the loss function 410 in the image domain.

The gold-standard sample image refers to a sample image used for reference. As one aspect, information (e.g., information about structures, and pixel values) of the sample first image may be remained in the gold-standard sample image, and a fidelity of the gold-standard sample image exceeds a fidelity of the sample second image. As another aspect, the gold-standard sample image has a higher signal-to-noise ratio and a higher resolution compared to the sample first image. In some embodiments, the gold-standard sample image may be obtained by a manner of simulation. For example, the gold-standard sample image may be obtained by performing a simulation on a human structure, a process of pathological changes, or a pathological process using a simulation technology. In some embodiments, the gold-standard sample image may be obtained by performing an optimization operation (e.g., a denoising operation, a super-resolution optimization operation, an artifact-reducing operation, etc.) on a sample image (e.g., a sample first image). In some embodiments, the optimization operation may be performed manually by an operator (e.g., a doctor, a medical imaging experts, etc.). In some embodiments, the optimization operation may be performed by a processing device that is the same as or different from the processing device 120 automatically.

The loss function in the K-space data domain may be configured to reflect a difference between the second K-space dataset and the sample reference K-space dataset. In some embodiments, the loss function in the K-space data domain may be obtained based on the second K-space dataset and the sample reference K-space dataset. For example, as shown in FIG. 4, the loss function 420 in the K-space data domain may be obtained based on the second K-space dataset 421 and the reference K-space dataset 422. For example, the fidelity module may perform a standard deviation processing, or a cross entropy processing on the second K-space dataset 421 and the reference K-space dataset 422 to obtain the loss function 420 in the data domain.

The fidelity model may be updated based on the loss function in the image domain and the loss function in the K-space data domain to make the fidelity effect more natural.

A training process for the fidelity model is shown in FIG. 5 and the relevant description.

In some embodiments, the processing device 120 may obtain multiple fidelity models corresponding to different fusion levels (also referred to as levels).

In some embodiments, each fidelity model may correspond to a fusion level. The fusion level may be denoted by a proportion relationship between a sample first image and a sample second image or denoted by a proportion relationship between a sample first K-space dataset corresponding to the sample first image and a sample second K-space dataset corresponding to the sample second image during the training of the fidelity model. In some embodiments, the fusion levels may be default settings or preset by an operator. For example, 7 fusion levels may be provided, and each fusion level may correspond to a proportion relationship between the sample first image and the sample second image. As a further example, Level 1 corresponds to a proportion relationship of 10:90 between the sample second image and the sample first image; Level 2 corresponds to a proportion relationship of 30:70 between the sample second image and the sample first image, etc. More descriptions regarding the level may be found elsewhere in the present disclosure, for example, FIG. 5 or the descriptions thereof.

The multiple fidelity models corresponding to different fusion levels may provide for different requirements of operators.

In some embodiments, the processing device 120 may determine the fusion level and the corresponding fidelity model based on user preferences. In some embodiments, the processing device 120 may determine the fusion level and the corresponding fidelity model based on a scanning type, a scanning site, a scanning protocol, or other factors.

In some embodiments, the processing device 120 may determine the level and the corresponding fidelity model for a fidelity processing based on a user preference. For example, the processing device 120 may display processed images with the fidelity processing in different levels and differences between the processed images by the terminal 130 to a current doctor (a person who is using a system for processing the medical image) for selection. Then, the processing device 120 may record the current doctor's preference setting and display the processed images based on the preference setting when the current doctor logs in to the system again. In some embodiments, the smaller the fusion level is, the larger the fidelity degree of the third image may be.

In some embodiments, the processing device 120 may determine the level and the corresponding fidelity model based on a scanning type. The scanning type refers to a category of the MRI. The type of the MRI may include an MR plain scan, an MR enhancement, a MR spectroscopy imaging, a MR diffusion tensor imaging, etc. For example, a level of the MR plain scan may be level 1, a level of the MR enhancement may be level 2, a level of the MR spectroscopy imaging may be level 3, and a level of the MR diffusion tensor imaging may be level 4.

In some embodiments, the processing device 120 may determine the level and the corresponding fidelity model based on a scanning site. The scanning site refers to a region where the MRI is performed on. The scanning site may include a head, cervical spine, lumbar spine, thyroid, breast, liver, spleen, gallbladder, pancreas, kidneys, lower and upper limbs. For example, when scanning the head, the level may be level 1. When scanning the cervical spine, the level may be level 2. When scanning the lumbar spine, the level may be level 3. When scanning the thyroid, the level may be level 4. When scanning the breast, the level may be level 5.

In some embodiments, the processing device 120 may determine the level and the corresponding fidelity model based on a scanning protocol such as an MRI protocol. The MRI protocol may be a set of instructions and parameters designed to guide the execution of MRI scanning. The MRI protocol may include a T1-weighted image protocol, a T2-weighted image protocol, a proton density-weighted image protocol, a diffusion-weighted image protocol, a dynamic contrast-enhanced scan protocol, etc. For example, when using the T1-weighted image protocol, the level may be level 1. When using the t2-weighted image protocol, the level may be level 2. When using the proton density-weighted image protocol, the level may be level 3. When using the diffusion-weighted image protocol, the level may be level 4. When using the dynamic contrast-enhanced scan protocol, the level may be level 5.

In some embodiments, the processing device 120 may determine the level and the corresponding fidelity model based on both the scanning protocol and the scanning site. For example, when the T1-weighted image protocols used for scanning of the head, the level may be level 1. When the the T2-weighted image protocol is used for the scanning of the cervical spine, the level may be level 2.

In some embodiments, the processing device 120 may adjust the level corresponding to different scanning types and/or different scanning sites based on user preferences. It can be understood that the same user may have different level preferences for different scanning types and/or different scanning sites. For example, a doctor A prefers to set the level to level 3 when performing the MR enhancement scan on the cervical spine. When performing MRI on the thyroid gland, the doctor A prefers to set the level to level 4. In some embodiments, the processing device 120 may record level preferences of each user for different scanning types and/or scanning site. When the user uses the system again (e.g., when logging in again and selecting the scanning type and/or scanning site), the second image may be processed for fidelity with a corresponding level based on the user's level preferences.

It should be noted that the above description of process 300 is merely provided for illustration, and may not intended to limit the scope of the present disclosure. For those of ordinary skill in the art, various changes and modifications may be made on process 300. However, these changes and modifications may not deviate from the scope of the present disclosure.

FIG. 5 is a schematic diagram illustrating an exemplary process for training a fidelity model according to some embodiments of the present disclosure.

As shown in FIG. 5, in some embodiments, a preliminary fidelity model 510 may be trained based on a large count of labeled training samples to update parameters of the preliminary fidelity model to obtain a fidelity model 520 (also referred to as a trained first machine learning model). In some embodiments, the preliminary fidelity model may include a machine learning model, for example, a deep neural network (DNN) model, a support vector machine model, a k-nearest neighbor model, a decision tree model, or the like, or any combination thereof.

In some embodiments, the processing device 120 may obtain a plurality of training samples. Each of the plurality of training samples may include one or more sample images and one or more sample K-space datasets.

The one or more sample images may include a sample second image determined based on a sample first image and a gold-standard sample image corresponding to the sample second image.

In some embodiments, the sample first image refers to an image without being optimized. The sample first image may include noises, artifacts, or may be in a low resolution, or the like. In some embodiments, the sample first image may be obtained by scanning an object, or may be obtained by calling a historical image in a database or an archive system. The obtaining of the sample first image may be the same as or similar to the obtaining of the first image in operation 310, the descriptions of which are not repeated.

The sample second image refers to an image obtained by performing an optimization operation on the sample first image. The optimization operation may include a denoising operation, a super-resolution optimization operation, etc. In some embodiments, the sample second image may be obtained by performing the optimization operation on the sample first image. The obtaining of the sample second image may be the same as or similar to the obtaining of the second image in operation 320, the descriptions of which are not repeated.

The one or more sample K-space datasets may include a sample second K-space dataset corresponding to the sample second image and a sample reference K-space dataset. In some embodiments, the sample reference K-space dataset may be determined based on the sample first image and the sample second image.

In some embodiments, the processing device 120 may determine the sample reference K-space dataset based on a sample first K-space dataset corresponding to the sample first image and the sample second K-space dataset corresponding to the sample second image.

In some embodiments, the processing device 120 may use the following two manners or any combination thereof to obtain the sample reference K-space dataset.

Manner 1: the processing device 120 may obtain the sample first K-space dataset corresponding to the sample first image and the sample second K-space dataset corresponding to the sample second image.

In some embodiments, the sample first K-space dataset may be obtained by performing a Fourier transform on the sample first image. In some embodiments, the first K-space dataset may be obtained by the scanning device 110 and/or the processing device 120. For example, the scanning device 110 and/or the processing device 120 may output an intermediate result (i.e., a K-space dataset without inverse Fourier transform) during an acquisition process of the sample first image.

In some embodiments, the sample second K-space dataset corresponding to the sample second image may be obtained by performing the Fourier transform on the sample second image.

The processing device 120 may fuse the sample first K-space dataset and the sample second K-space dataset to obtain the sample reference K-space dataset. The sample reference K-space dataset may be obtained by a fusion in different proportions of the sample first K-space dataset and the sample second K-space dataset based on the application requirements.

In some embodiments, the processing device 120 may fuse the sample first K-space dataset and the sample second K-space dataset by a fusion level. The fusion level may include a K-space fusion level. The K-space fusion level may be denoted by proportion relationship between the first sample K-space dataset and the second sample K-space dataset during the fusion process. The processing device 120 may perform the fusion of the first sample K-space dataset and the second sample K-space dataset based on the fusion level to obtain the reference sample K-space dataset. In some embodiments, the processing device 120 may multiply each data point of the first sample K-space dataset by a proportion (e.g., 30%) of the first sample K-space dataset and multiple the corresponding data point of the second sample K-space dataset by a proportion (e.g., 70%) of the second sample K-space dataset to obtain the processed data point of the first sample K-space dataset and the corresponding processed data point of the second sample K-space dataset, and the processing device 120 may obtain the corresponding data point of the reference sample K-space dataset by adding the processed data point of the first sample K-space dataset and the corresponding processed data point of the second sample K-space dataset.

In one embodiment, multiple fusion levels may be preset. The processing device 120 may select one of the multiple fusion levels to fuse the sample first K-space dataset and the sample second K-space dataset. For example, the sample first K-space dataset and the sample second K-space dataset may be divided into 7 levels with different proportions. For example, the 7 level may be level 0 (the sample second K-space dataset: the sample first K-space dataset=0%: 100%); level 1 (the sample second K-space dataset: the sample first K-space dataset=10%: 90%); level 2 (the sample second K-space dataset: the sample first K-space dataset=30%: 70%); level 3 (the sample second K-space dataset: the sample first K-space dataset=50%: 50%); level 4 (the sample second K-space dataset: the sample first K-space dataset=70%: 30%); level 5 (the sample second K-space dataset: the sample first K-space dataset=90%: 10%); level 6 (the sample second K-space dataset: the sample first K-space dataset=100%: 0%).

In an embodiment, a K-space may be divided into at least two regions, and each region may be provided with a corresponding proportional relationship to fuse the first K-space dataset and the second K-space dataset to obtain the sample reference K-space dataset.

In some embodiments, the K-space may be divided into at least two regions, and each region may be assigned a corresponding fusion level for fusing the first sample K-space dataset and the second sample K-space dataset to obtain the sample reference K-space dataset. For example, the K-space may be divided into a first region and a second region, and the processing device 120 may assign different fusion levels to the first region and the second region. For example, the processing device 120 may assig level 1 to the first region and level 2 to the second region. The processing device 120 may fuse the K-space data of the first region in the sample first K-space dataset and the K-space data of the first region in the sample second K-space dataset based on the corresponding first proportional relationship at level 1 to obtain fused first K-space data in the first region. The processing device 120 may fuse the K-space data of the second region in the sample first K-space dataset and the K-space data of the second region in the sample second K-space dataset based on the corresponding second proportional relationship at level 2 to obtain fused second k-space data in the second region. The processing device 120 may obtain the sample reference K-space dataset based on the fused first k-space data and the fused second k-space data.

In some embodiments, the first proportional relationship and the second proportional relationship may be provided based on features of the K-space dataset. In some embodiments, K-space dataset in a portion of regions in K-spaces may be fused, such as fusing the K-space dataset in a portion of the first region and the second region with a proportion relationship of level 0 or level 6. The fusion level corresponding to each region in the k-space may be provided based on a feature of K-space data. For example, the processing device 120 may assign the fusion level corresponding to a region based on the distance of the region from the K-space center. For instance, Region 1 may represent the area within 0-10% distance from the K-space center, Region 2 may represent the area within 10-30% distance from the K-space center, and Region 3 may represent the area within 30-100% distance from the K-space center. The processing device 120 may determine the fusion level for Region 1 to Level 1, for Region 2 to Level 3, and for Region 3 to Level 5.

The level is determined based on the user's requirements and/or preferences, and users can choose whether the fidelity effect is closer to the first image or closer to the second image, which is more flexible to meet user's requirements.

In some embodiments, a K-space may be divided into a central region of the K-space and a surrounding region of the K-space. Thus, K-space data of the central region in the sample first K-space dataset and K-space data of a central region in the sample second K-space dataset may be fused. For example, by using level 0 to fuse the K-space data in the central region, K-space center data of the sample reference K-space dataset may be designated as K-space center data of the sample first K-space dataset. The K-space center data refers to K-space data in the central region of K-space, such as data within a certain distance range centered around a central point of the K-space. The proportion of the certain distance range to the whole range of the k-space dataset may be 1%, 2%, 3%, 5%, 10%, 15%, etc. Due to the fact that the K-space center data may determine an overall structure and contrast of an image (e.g., an MRI image), replacing the K-space center dataset of the sample second image with the K-space center data of the sample first image may greatly preserve the overall structure and contrast information of the sample first image and improve a fidelity effect of an optimized output image (e.g., the second image) processed by the fidelity model.

Using the K-space center data of the sample first image as a constraint of the DNN is beneficial for achieving image fidelity effect in aspects of the overall structure and contrast.

In some embodiments, K-space data in the surrounding region may not be fused, or a different proportion relationship may be used when fusing the K-space data in the central region and the surrounding region. Due to the fact that the surrounding region of the K-space is related to details of an image, in order to improve image processing effects (e.g., denoising, artifact removal, super-resolution, etc.). Preferably, a weight of the surrounding region in the K-space of the second image may be provided greater than a proportion of the surrounding region in the K-space of the first image, and a fusion operation may be performed on the K-space data of the surrounding region in the K-space of the sample second image and the surrounding region in the K-space of the sample first image based on the weight, thus preserving the effect of image optimization processing to a large extent.

Manner 2: the processing device 120 may fuse the sample first image and sample second image to obtain a fused sample image. In some embodiments, multiple fusion levels (also referred to as image fusion levels) based on different proportions of the first image sample and the second image sample may be defined.

In some embodiments, the fusion levels may be a default setting of the system 100 or determined by an operator. The processing device 120 may select one of the multiple fusion levels to fuse the sample first image and the sample second image. For example, the fusion levels may include level 0 (the sample second image:the sample first image=0%: 100%); level 1 (the sample second image:the sample first image=10%:90%); level 2 (the sample second image:the sample first image=30%:70%); level 3 (the sample second image:the sample first K-space dataset=50%:50%); level 4 (the sample second image:the sample first image=70%: 30%); level 5 (the sample second image:the sample first image=90%:10%); level 6 (the sample second image:the sample first image=100%:0%). Level 0 may be equivalent to the sample first image, features (e.g., pixel values, structures, etc.) of an image in level 1 may be closer to features of the sample first image, followed by an image in level 2. Features of images in levels 3 and 4 may gradually approach features of the sample second image, features of an image in level 5 may be closer to the features of the sample second image, and features of an image in level 6 may be equivalent to the features of the sample second image. In some embodiments, the fusion level is an open parameter that is provided based on requirements and/or doctor preferences. In some embodiments, an initial default level may be level 2.

In some embodiments, the fusion level may include the image fusion level and the k-space fusion level. During the training of the fidelity model for the fusion level, the image fusion level and the K-space data fusion level may be consistent. For example, for the training of a fidelity model with a fusion level 2, both the image fusion level and the K-space data fusion level may be set to level 2.

In some embodiments, the processing device 120 may fuse the sample first image and sample second image using a fusion technique. For example, the fusion technique may include a principal component transform fusion technique, a product transform fusion technique, a wavelet transform fusion technique, a Laplace transform fusion technique, or any combination thereof. For example, the principal component transformation fusion method may be used to fuse the sample first image and the sample second image to obtain the fused sample image.

The processing device 120 may obtain a fused K-space dataset (i.e., the sample reference K-space dataset) of a corresponding fused sample image by performing the Fourier transform on the fused sample image.

In some embodiments, the processing device may train the preliminary fidelity model based on the plurality of training samples according to an iterative process. In response to that a preset condition is met, the trained first machine learning model may be obtained. The preset condition may include a convergence of a loss function or the loss function being less than a preset threshold.

In some embodiments, the processing device may obtain the plurality of training samples, including corresponding labels (e.g., the sample gold-standard image, the sample reference K-space dataset), by reading or calling a data interface from a database or a storage device.

In some embodiments, as shown in FIG. 5 the processing device may obtain a sample second image 512 by optimizing a sample first image 511. Alternatively, in some embodiments, the processing device may input the sample first image 511 into the trained second machine learning model for image optimization to obtain the sample second image 512.

In some embodiments, the processing device may construct a loss function in an image domain and a loss function in a K-space data domain based on the sample second image 512 and labels of the plurality of training samples, and determine a loss function based on the loss function in the image domain and the loss function in the K-space data domain.

In some embodiments, the processing device 120 may perform an iterative process (e.g., including a plurality of iterations) for training the preliminary machine learning model with a plurality of training samples to obtain the fidelity model (i.e., the trained first machine learning model). When an iteration termination condition is met, the iterative process may be ended. The iteration termination condition may include that the loss function converges or is less than a preset threshold, a count of iterations reaches a preset value, etc.

For example, the iterative process may include: determining a gradient of the loss function of the fidelity model, and iteratively updating parameters of the preliminary machine learning model by a manner of gradient descent to reduce a difference between the sample second image and the gold-standard sample image. The manner of gradient descent may include a manner of standard gradient descent and a manner of random gradient descent. A plurality of learning rate attenuation strategies may be used in the iterative process, such as a piecewise attenuation, an inverse time attenuation, an exponential decay, and an adaptive attenuation.

It should be noted that the above descriptions are for illustration purposes. In some embodiments, the fidelity model may also be obtained based on other training manners. For example, a corresponding preliminary learning rate (e.g., 0.1) and a learning rate attenuation strategy may be provided for the fidelity model. Additionally the fidelity model may be obtained based on a joint training with the optimization model based on the plurality of training samples with labels, which may not be limited in the present disclosure.

It should be noted that the above description of process 500 is merely provided for illustration, and may not intended to limit the scope of the present disclosure. For those of ordinary skill in the art, various changes and modifications may be made on process 300. However, these changes and modifications may not deviate from the scope of the present disclosure. In some embodiments, the model generation process described in FIG. 5 and image processing (e.g., generating the second image and generating the third images described in FIG. 3) may be performed on different processing devices. For example, the model generation process described in FIG. 5 may be performed on the processing device of a manufacturer of the scanning device, while some or all operations of the image processing may be performed on the processing device of the user of the scanning device (e.g., a hospital).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method being executed by a computing device including at least one processor and storage medium, comprising:

obtaining a first image;

determining a second image by optimizing the first image, wherein a quality of the second image is better than a quality of the first image, the first image is optimized using an optimization model, the optimization model includes a trained second machine learning model, and the optimization model is selected from a plurality of trained second machine learning models;

the plurality of trained second machine learning models correspond to different image resolution ranges, and the selection is based on a resolution of the first image; and obtaining a third image by inputting the second image and a K-space dataset determined based on the second image into a fidelity model, wherein the fidelity model includes a trained machine learning model.

2. The method of claim 1, wherein a training process of the fidelity model includes:

obtaining a plurality of training samples, each of the plurality of training samples including one or more sample images and one or more sample K-space datasets, the one or more sample images including a sample second image determined by optimizing a sample first image and a gold-standard sample image corresponding to the sample second image, wherein the gold-standard sample image has a higher signal-to-noise ratio or a higher resolution than the sample first image, the one or more sample K-space datasets including a sample second K-space dataset corresponding to the sample second image and a sample reference K-space dataset, the sample reference K-space dataset being determined based on the sample first image and the sample second image or determined based on the sample second K-space dataset and a sample first K-space dataset corresponding to the sample first image;

training a preliminary fidelity model based on the plurality of training samples; and in response to that a preset condition is met, obtaining the fidelity model.

3. The method of claim 2, wherein at least one loss function of the fidelity model includes a loss function in an image domain and a loss function in a K-space data domain;

the training process includes training the preliminary fidelity model based on the plurality of training samples by collectively using the loss function in the image domain and the loss function in the K-space data domain.

4. The method of claim 3, wherein the loss function in the image domain is obtained based on the sample second image and the gold-standard sample image.

5. The method of claim 3, wherein the loss function in the K-space data domain is obtained based on the sample second K-space dataset and the sample reference K-space dataset.

6. The method of claim 2, wherein the determining the sample reference K-space dataset based on a first K-space dataset corresponding to the sample first image and the second K-space dataset corresponding to the sample second image includes:

designating K-space center data of the sample first K-space dataset as K-space center data of the sample reference K-space dataset.

7. The method of claim 6, wherein determining the sample reference K-space dataset further comprises:

performing a fusion operation on K-space data of a surrounding region in the sample second K-space dataset and K-space data of a surrounding region in the sample first K-space dataset based on weights;

wherein a weight of the surrounding region from the sample second K-space dataset is greater than a weight of the surrounding region from the sample first K-space dataset.

8. The method of claim 2, wherein the sample reference K-space dataset is determined according to operations including:

determining a fusion level, the fusion level representing a proportional relationship between the sample first image and the sample second image or the fusion level representing a proportional relationship between the sample first K-space dataset and the sample second K-space dataset; and determining, based on the fusion level, the sample reference K-space dataset.

9. The method of claim 8, further comprising:

determining the fusion level based on at least one of a scanning type, a scanning site, or a scanning protocol.

10. The method of claim 8, wherein the fusion level is spatially varied across the K-space based on a distance of a region from a K-space center.

11. A system, comprising:

at least one storage device storing a set of instructions; and at least one processor in communication with the storage device, wherein when executing the set of instructions, the at least one processor is configured to cause the system to perform operations including:

obtaining a first image;

determining a second image by optimizing the first image, wherein a quality of the second image is better than a quality of the first image, the first image is optimized using an optimization model, the optimization model includes a trained second machine learning model, and the optimization model is selected from a plurality of trained second machine learning models; the plurality of trained second machine learning models correspond to different image resolution ranges, and the selection is based on a resolution of the first image; and obtaining a third image by inputting the second image and a K-space dataset determined based on the second image into a fidelity model, wherein the fidelity model include a trained machine learning model.

12. The system of claim 11, wherein a training process of the fidelity model includes:

obtaining a plurality of training samples, each of the plurality of training samples including one or more sample images and one or more sample K-space datasets, the one or more sample images including a sample second image determined by optimizing a sample first image and a gold-standard sample image corresponding to the sample second image, wherein the gold-standard sample image has a higher signal-to-noise ratio or a higher resolution than the sample first image, the one or more sample K-space datasets including a sample second K-space dataset corresponding to the sample second image and a sample reference K-space dataset, the sample reference K-space dataset being determined based on the sample first image and the sample second image or determined based on the sample second K-space dataset and a sample first K-space dataset corresponding to the sample first image;

training a preliminary fidelity model based on the plurality of training samples; and in response to that a preset condition is met, obtaining the fidelity model.

13. The system of claim 12, wherein at least one loss function of the fidelity model includes a loss function in an image domain and a loss function in a K-space data domain;

the training process includes training the preliminary fidelity model based on the plurality of training samples by collectively using the loss function in the image domain and the loss function in the K-space data domain.

14. A non-transitory computer readable medium storing instructions, the instructions, when executed by at least one processor, causing the at least one processor to implement a method comprising:

obtaining a first image;

determining a second image by optimizing the first image, wherein a quality of the second image is better than a quality of the first image, the first image is optimized using an optimization model, the optimization model includes a trained second machine learning model;

the trained second machine learning model is trained based on sample noise images and one or more auxiliary parameters include at least one of a color, a depth, or a normal vector derived from each of the sample noise images; and obtaining a third image by inputting the second image and a K-space dataset determined based on the second image into a fidelity model, wherein the fidelity model includes a trained machine learning model.

\* \* \* \* \*